(12) United States Patent
Wang et al.

(10) Patent No.: US 9,519,718 B2
(45) Date of Patent: Dec. 13, 2016

(54) WEBPAGE INFORMATION DETECTION METHOD AND SYSTEM

(75) Inventors: Song Wang, Beijing (CN); Rufeng Liang, Beijing (CN); Dan Zhang, Beijing (CN); Hong'e Sun, Beijing (CN); Jianwu Yang, Beijing (CN); Xinli Wu, Beijing (CN)

(73) Assignees: Peking University Founder Group Co., Ltd., Beijing (CN); Peking University, Beijing (CN); Beijing Founder Electronics Co., Ltd., Beijing (CN); Peking University Founder R & D Center, Beijing (CN)

( * ) Notice: Subject to any disclaimer, the term of this patent is extended or adjusted under 35 U.S.C. 154(b) by 393 days.

(21) Appl. No.: 13/997,251

(22) PCT Filed: Dec. 22, 2011

(86) PCT No.: PCT/CN2011/084487
§ 371 (c)(1),
(2), (4) Date: Sep. 25, 2013

(87) PCT Pub. No.: WO2012/083874
PCT Pub. Date: Jun. 28, 2012

(65) Prior Publication Data
US 2014/0067784 A1    Mar. 6, 2014

(30) Foreign Application Priority Data
Dec. 22, 2010    (CN) .......................... 2010 1 0618403

(51) Int. Cl.
*G06F 17/30* (2006.01)
(52) U.S. Cl.
CPC ... *G06F 17/30867* (2013.01); *G06F 17/30616* (2013.01); *G06F 17/30663* (2013.01);
(Continued)

(58) Field of Classification Search
CPC .............. G06F 17/30876; G06F 17/30867; G06F 17/30616; G06F 17/30887; G06F 17/30864; G06F 17/30684; G06F 17/30663
(Continued)

(56) References Cited

U.S. PATENT DOCUMENTS

2005/0267915 A1    12/2005 Zhulong et al.
2006/0294052 A1*   12/2006 Kulkarni et al. .............. 707/705
(Continued)

FOREIGN PATENT DOCUMENTS

| CN | 101021866 A | 8/2007 |
| CN | 101201823 A | 6/2008 |

(Continued)

OTHER PUBLICATIONS

PCT/CN2011/084487, English translation of the International Search Report and Written Opinion, Mar. 8, 2012, 9 pages.
(Continued)

*Primary Examiner* — Shahid Alam
(74) *Attorney, Agent, or Firm* — Lathrop & Gage LLP

(57) ABSTRACT

The present application provides web information detecting method and system. The method according to the present application comprises: pre-extracting keywords from a web page; storing a corresponding relationship between the extracted keywords and a URL of the web page in a database; obtaining a source file of a web page to be detected; searching the database for keywords that have the same URL as that of the web page to be detected; comparing the searched keywords to the source file information of the web page to be detected; and determining the existence of information of the web page to be detected according to a matching degree. The present application increases the accuracy of web information detection.

15 Claims, 4 Drawing Sheets

(52) U.S. Cl.
    CPC .. *G06F 17/30684* (2013.01); *G06F 17/30864* (2013.01); *G06F 17/30876* (2013.01); *G06F 17/30887* (2013.01)

(58) Field of Classification Search
    USPC ........................................ 707/706, 640, 770
    See application file for complete search history.

(56) References Cited

U.S. PATENT DOCUMENTS

2009/0204595 A1\* 8/2009 Dombrowski et al. ....... 707/723
2009/0259693 A1\* 10/2009 O'Sullivan et al. .......... 707/609

FOREIGN PATENT DOCUMENTS

| CN | 101344889 A | 7/2008 |
| CN | 101788991 A | 7/2010 |
| JP | 2004070405 A | 3/2004 |
| JP | 2006259965 A | 9/2006 |
| JP | 2008165292 A | 7/2008 |

OTHER PUBLICATIONS

Yamamoto Yohei, HTTP, URI, HTML, REST そして (WEB+DB PRESS plus), Apr. 8, 2010, pp. 111-120.

\* cited by examiner

| 0 | 1 | 2 | 3 | ...... |
|---|---|---|---|---|
| Text block 1 | | | Text block 2 | ...... |

FIG. 4

WEBPAGE INFORMATION DETECTION METHOD AND SYSTEM

CROSS REFERENCE TO RELATED APPLICATIONS

This application is a 35 USC §371 National Stage application of International Application No. PCT/CN2011/084487 filed Dec. 22, 2011, which claims the benefit of priority to China Patent Application No. 201010618403.4 filed Dec. 22, 2010. The disclosure of each of the prior applications is considered part of and is incorporated by reference in the disclosure of this application.

TECHNICAL FIELD

The present application relates to the field of data monitoring, and in particular to web information detecting method and a system thereof.

TECHNICAL BACKGROUND

With the rapid global expansion of the World Wide Web, using the Internet to disseminate and capture information, specifically news related information, has become a primary channel for getting information for people. Generally, people can easily obtain any text or pictures from a computer screen via the Internet. At the same time, there is an increase in quantity, style, and channels for the distribution of news contents via the Internet. Email, internet news groups, forums, and websites have all made the Internet an important media outlet.

The information contained in the Internet is vast and complex, including a lot of good, progressive, and useful information and a lot of controversial material such as pornography, racism, and false information. The Internet is rapidly becoming a battle ground for ideas. Moreover, because of the anonymity one gets when browsing the Internet, more and more people are willing to express themselves through this channel. The rapid explosion of public opinions on the internet might gradually become a threat to social security in the form of "content threat".

The application of a network monitoring system could exert an effective control over the complex internet information. But, most of the traditional network monitoring systems is useless to the "hide and seek" operation tactic of certain undesired URLs, since the contents of those URLs are often deleted and restored repeatedly. Therefore, it is desirable to have a new web information detecting system with high accuracy.

There are a number of web information detecting methods currently deployed in various countries.

1. One detection method mainly utilizes XMLHTTP-based techniques and properties to obtain the information from the server. From the status code of a return request, such a method could determine if the content of the web page has been deleted. However, this method only provides information on the deletion of a URL, but does not provide information on the deletion or change of the contents of the original URL. Such a method can be relatively inaccurate.

2. Another detection method obtains the status code from the HTTP's response information. The deletion of URL is determined by status code of 200 or 401. Such a method cannot determine the contents of the web, only the deletion status of the URL. The accuracy of this detection method is relatively low.

3. Yet another detection method has also been proposed, in which the domain name is resolved into IP address to check if the URL is deleted, specifically by determining if the sockets are normal. This method can also be inadequate if the contents have already been deleted.

The above existing methods for determining the web information generally have low accuracy. Most of them rely on the return code to determine whether the URL in question has been deleted. Not only do they have difficulty to detect if a URL exists, those methods cannot determine whether the content has been erased or changed.

SUMMARY OF INVENTION

The technical problem to be solved by the present application is to provide an accurate method and system for web information detection.

In accordance with an aspect of the present application, a method for detecting web information is provided. The method comprises: pre-extracting keywords from a web page; storing a corresponding relationship between the extracted keywords and a URL of the web page in a database; obtaining a source file of a web page to be detected; searching the database for keywords that have the same URL as that of the web page to be detected; comparing the searched keywords to the source file information of the web page; and determining that the web page to be detected exists according to a matching degree P.

In accordance with another aspect of the present application, a system for detecting web information is provided. The system includes an extracting device configured to extract keywords from a web page, a storing device configured to store a corresponding relationship between the extracted keywords and a URL of the web page in a database, an obtaining device configured to obtain a source file of a web page to be detected, and a searching device configured to search the database for the keywords that have the same URL as that of the web page, to compare the searched keywords to the source file information of the web page and to determine that the web page exists according to a matching degree P.

The technical solution of the present application is to determine the existence of web information by utilizing the keywords extracted from the information of the web page. Such a technical solution could detect the existence of a URL as well as the changes in the web information, thus drastically improving the accuracy of the web information detection. Such detection could effectively maintain the desirability of the network environment, and provide increased security. Moreover, the present application also possesses the ability to provide a main body text, an abstract, and keywords for other networks to use. The main body text is extracted from HTML documents of complex structures as well as of a wide range of formats and types. As for the relevant abstract and keywords, they are obtained from the main body text, the title information, and web information.

BRIEF DESCRIPTION OF THE DRAWINGS

FIG. 4 is a schematic diagram of the storage of text blocks in an array according to one embodiment of the present application.

DETAILED DESCRIPTION

Hereinafter, the invention disclosed in the present application is explained in detail with reference to the accompanying drawings in connection with the embodiments.

One primary use of the applications of the invention disclosed in the present application is the detection of web information when the web address exists and the contents of the web have changed. The primary idea behind the application is as follows. First, the keywords are pre-extracted from the web information. And then the extracted keywords as well as a corresponding relationship between the extracted keywords and a URL of the web is stored in a database as contrast materials for the web information detection. When detecting the web information, firstly, an original source file of the target web page should be obtained. A search for the keywords that have the identical URL as the target web page from the database is then conducted. Then the keywords are compared to the source file information of the target web page. Based on the result of the comparing procedure, the existence of the web information is determined.

Figure 1:
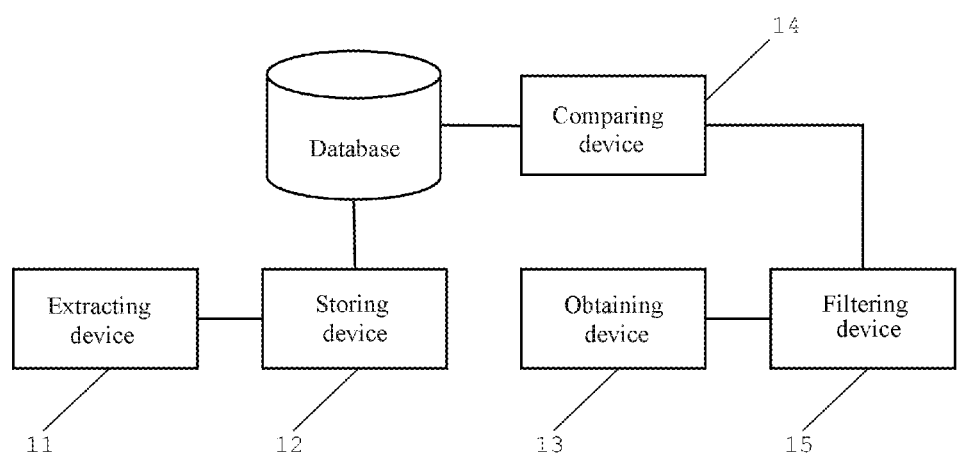
FIG. 1 is a structure diagram of a web information detecting system according to one embodiment of the present application.

FIG. 1 shows the structure of a web information detecting system according to one embodiment of the present application. As shown in the FIG. 1, the system includes an extracting device 11, a storing device 12 connected to the extracting device 11, a receiving device 13, a filtering device 15 connected to the receiving device 13, and a comparing device 14 connected to the filtering device 15.

The extracting device 11 is used to extract keywords from the information on the web page.

The storing device 12 stores the extracted keywords as well as the corresponding relationship between the keywords and the associated URL of the web page in a database as contrast materials for the web information detection.

The receiving device 13 receives the source file of the target web page.

The filtering 15 filters out the useless information, including the title in the source file of the target web page.

The comparing device 14 searches the database for the keywords with the URL that is identical to the URL of the target web page, and then compares the keywords to the source file of the target web page. Base on the matching degree of the keywords and the source file, the existence of the web information can be determined.

Figure 2:
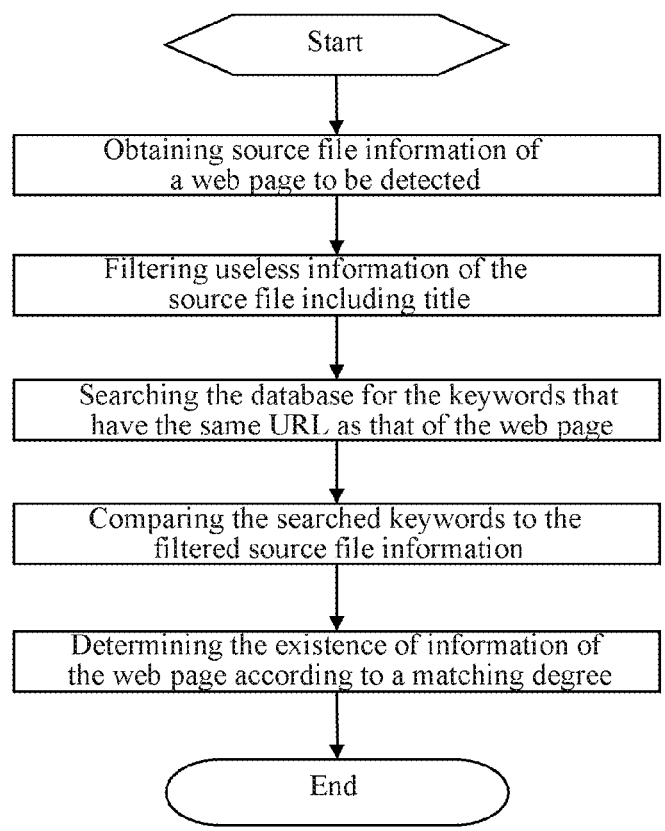
FIG. 2 is a flow diagram of a web information detecting method according to one embodiment of the present application.

FIG. 2 shows a flow diagram of a web information detecting method using the system shown in FIG. 1. As shown in FIG. 2, the method includes the following steps.

(1) The receiving device 13 receives HTML source file of a target web page.

(2) The filtering device 15 filters out the useless information including a title in the source file of the target web page to obtain a clearer text information source file.

A useless HTML tag library for storing all useless HTML tags is predefined. The useless HTML tags include the tag types for title, formulate sentence, multimedia sentence, modifier, table input and hyperlink.

The source file information and the useless HTML tag library are combined together, and all useless tags and the contents those tags associated with can be deleted by organizing a specific regular expression. Only the tag type and the contents associated with this tag type of a partitionable type are remained.

Filtering out the title tag here is to prevent the deletion of the web information and the existence of the title to interfere with the detection process.

(3) The comparing device 14 reads the keywords that have the identical URL as the target web page from the database. Afterward, the comparing device 14 compares the read keywords to the filtered the source file information of the target web page.

The keywords stored in the storing device are compared to the text information of the source file, and then the existence of the web page information is determined by a matching degree P. The matching degree P is used to determine if the target web page is a complete match or a partial match according to specific environmental parameters.

Figure 3:
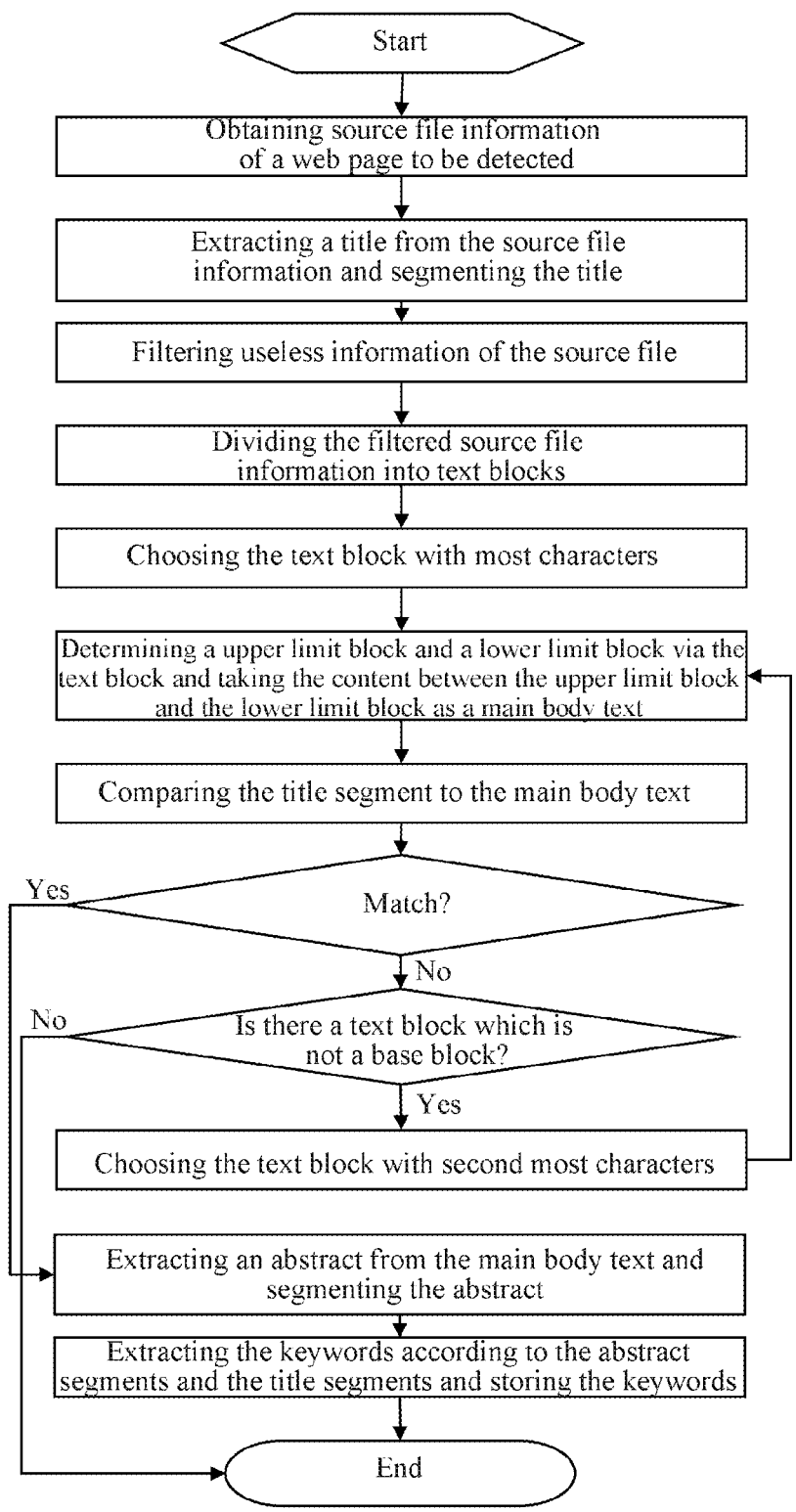
FIG. 3 is a flow diagram of a method for extracting keywords from a web information according to one embodiment of the present application.

FIG. 3 shows a flow diagram of a method for extracting the keywords of the web information according to one embodiment of the present application. As shown in FIG. 3, the method includes the follow steps.

(a) A Step of Reading Source File Information of a Web Page

When reading the source file of the web page, first HTTP is emulated to request for returning a information status code. When the status code is not 200 or something unusual occurs, the deletion of web information of that URL can be determined directly. Otherwise, if a 200 status code returns, using command "getResponseBody( )" from HttpMethodBase to obtain the bit arrays and coding format of the source file. With this code format and the bits arrays information, the bit arrays in the source file are converted into source file information of character format.

(b) A Step of Receiving the Title Information Form the Source File Information of the Web.

Base on the source file information, the title information from the title tag is obtained by using tag matching or a regular expression. In one of the embodiments, Lucene segmentation is used to segment the title. If there is no title or only a short phrase for the title, then during the later detection process the title would not be use as reference. The return title could be left blank.

(c) A Step of Extracting the Content from the Source File Information.

The process for extracting the content from the source file information is as follow.

(i) Filtering Out the Useless Information in the Source File.

The source file information and the useless HTML tag library are combined together, and all useless tags and the contents those tags associated with can be deleted by organizing a specific regular expression. Accordingly, the tag types for title, formulate sentence, multimedia sentence, modifier, table input and hyperlink as well as the contents associated with them are deleted subsequently. Only the tag type and the contents associated with this tag type of a partitionable type are remained.

(ii) Partitioning the Filtered Source File Information

A character interception algorithm is executed based on the information of the filtered source file in accordance with the tags for partitioned sections. Then the source file information is divided into a number of text blocks. At the same time, the total number of the partitionable type tags between any two random adjacent text blocks can be obtained.

For example, it is assumed that the filtered file A is consisted of two text blocks $A_1$ and $A_2$. Between $A_1$ and $A_2$, there are only two randomly positioned partitionable type tags $B_1$ and $B_2$ with number $n_1$ and $n_2$ respectively. According to the character interception algorithm, A is intercepted according to the tag $B_1$ to obtain $A_{B1}$ and $A_{B2}$ blocks, as well as the tag $B_1$ numbered $n_1$ therebetween. The source file block A without the tag $B_1$ is obtained by combining blocks $A_{B1}$ and $A_{B2}$ together. Similarly, A is intercepted according to the tag $B_2$ to obtain a new set of $A_{B1}$ and $A_{B2}$ blocks, as well as the tag $B_2$ numbered $n_2$ therebetween, and so on.

After dividing the filtered source file into a number of text blocks, all the character information within each individual text block without the tag as well as the distance from an individual text block to the next text block are stored. Specifically, the above goal can be implemented via one of the two following processes.

① A process in which the information (data) is stored via a list is proposed. The stored data contains two attributes. One attribute is the character information within the text block and the other attribute is the distance to the next text block.

Figure 4:
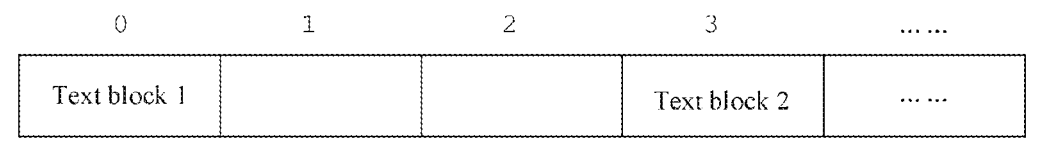

② A process in which the information is stored via a character array is proposed. The character information within a text block (hereafter referred to text block) is scattered into a character array. Here, the distance between two adjacent text blocks can be identified by the number of blanks between the stored locations of the two text blocks in the arrays. As shown in FIG. 4, the null value between text block 1 and text block 2 is 2, that represents the distance between text block 1 and text block 2 is 2.

The distance between two text blocks can be determined by the partitionable type tags. Here, the frequency of a partitionable tag appears in the source file information is a weight, and the distance can be calculated by combining the weight and the number of the partitionable type tags. The specific calculation is as follow. It is assumed that two adjacent text blocks are $A_1$ and $A_2$, and there are partitionable type tags $B_1 \ldots B_n$, the weights of the tags are $W_{B1} \ldots W_{Bn}$, and the number of the partitionable type tags between $A_1$ and $A_2$ are as $n_{B1} \ldots n_{Bn}$, respectively. Therefore the distance $d_{A1A2}$ between $A_1$ and $A_2$ is calculated as:

$$d_{A1A2} = n_{B1} \times W_{B1} + n_{B2} \times W_{B2} + \ldots + n_{Bn} \times W_{Bn}.$$

The weight can be set by user in accordance with the operating environment. In other embodiment of the present application, the distance between the two text blocks can be calculated by other means. The purpose of the calculation is to determine the relative distances between the text blocks.

Due to the complexity of the web page information, the source file has to be divided into text blocks. There are always advisements or other useless information inserted into the main body text, and thus the main body text seeing form source file perspective is not as a whole block rather they are scattered.

(iii) Determining the Main Body Text Sample.

The text block that contains the most text information (such a block should satisfy a preset length requirement, the specific requirement is defined by the user in accordance with the operation environment, for example, no less then 20 characters) can be selected as a base block, and then the remain text blocks are searched from the base block upwards and downwards. The upper limit text block and the lower limit text block are determined by the relationship between a threshold and a ratio (distance ratio) of the character count of the text blocks above and below to the distance. The distance ratio is the ratio of the base block and the rest text blocks (thus provide a density for the text), and the threshold could be determined experimentally. The information hold between the upper and lower limit text blocks is considered as a main body text sample.

Specifically, it is assumed that A is the base block that contains the most text information, including a characters. The adjacent text block above the base block is $A_1$, which has $a_1$ characters. The lower adjacent text block is $A_2$, including $a_2$ characters. $A_1$ and the A has a distance of $d_1$, A and $A_2$ has a distance of $d_2$. The threshold is M, and the value of M could be set by a user in accordance with the operation environment.

If $a_1/d_1 = M_1 \geq M$, and $a_2/d_2 = M_2 \geq M$, then both the above and below adjacent text block $A_1$ and $A_2$ of text block A are qualified to be combined to the main body text. The average $M_{avg}$ of $M_1$ and $M_2$ is taken as a measured scale for calculating the upper and lower limit blocks. In this regard, the measured scale could be obtained by other means such as defining by the user in accordance with the operation environment. If the measured scale is evaluated on case by case basis, the accuracy of detection will increase.

If one of $M_1$ and $M_2$ is larger or equal to the threshold M, then the one that is larger or equal to the threshold M is taken and averaged with M to obtain a new $M_{avg}$ as the measured scale for calculating the upper and lower limit blocks.

If none of them satisfy the requirement, then there is no need to continue the radiate search in direction either above or below, the base text block can be simply taken as the main body text sample.

After $M_{avg}$ is calculated, the text block A is reorganized. If $a_1/d_1 = M_1 \geq M$, and $a_2/d_2 = M_2 \geq M$, then $A' = A_1 + A + A_2$, that is to incorporate the text block $A_1$ and block $A_2$ into the text block A. The $A_1$ becomes the new base block and is taken as an anchor, and then the searching is conducted from $A_1$ in an upward direction. The $A_1$ is compared to an upper adjacent text block $A_{s1}$. $M_{avg}$ is compared to the ratio of the number of characters in the text block $A_{s1}$ to the distance $d_{s1}$ between $A_1$ and $A_{s1}$. If the ratio is greater then $M_{avg}$, then the text of $A_{s1}$ is incorporated into A, and the searching is continued in an upward direction with $A_{s1}$ as the base block. This process repeats in the upward direction as well as the downward direction until one of the text blocks does not satisfy the requirement. The text block A from the last incorporation becomes the main body text sample.

If only one of $M_1$ and $M_2$ is larger or equal to threshold M. For example $M_1 \geq M$, then the content of the text block $A_1$ will be incorporated into the text block A, that is $A' = A + A_1$. The process is continuously repeated with $A_1$ as an anchor and the searching is conducted in an upward direction, until one of text blocks does not satisfy the requirement. Because $M_2 < M$ does not satisfy radiate requirements, there is no downward radiate search. Then the last text block A' becomes the main body text sample.

Normally, the more characters there are, the less distance exists between the text blocks, this makes said text more likely to become the main body text. The chance of a text block being the main body text is directly proportion to the number of characters in that text block.

(iv) Verifying the Main Body

The title is divided into segments and the segments are compared to the main body text sample and the resulting matching degree would determine the authenticity of the file. The matching degree is defined by the frequency and the total number of appearance of the title segment in the main body text sample (the weight for the appearance and the frequency are user defined).

Specifically, it is assumed that the title can be divided into $W_1 \ldots W_n$ segments. The weight is determined to be $w_1 \ldots$ . $w_n$ after a sample training. The matching numbers in the main body text are $n_{w1} \ldots n_{wn}$ respectively. The sample training is a well known method by a person skilled in the art. The method basically divides the main body text into segments, and then combines the frequency of appearances for each individual segment in the main body text with the weight of each keyword as well as the keyword database (here a keyword database is mostly maintained for the frequent used keywords on the internet, each keyword has been assigned with a weight after lengthen statistic analysis, words like "you, me, he/she" are not included) to calculate the keywords and the weight for each of them.

The equation of calculating the matching degree of P' is as follow:

$$P'=n_{w1} \times w_1 + n_{w2} \times w_2 + \ldots + n_{wn} \times w_n. \qquad \text{(equation 1)}$$

If P' is greater or equal to the threshold M', then the main body text sample passes verification. Otherwise, the verification process would be a failure. The threshold M' is set by user in accordance to the operation environment.

If the verification process fails, the extracting procedure returns to step (iii). The text block with the most characters is ignored. Instead the extracting procedure takes the text block B with the second most characters as the base block for anchoring. The procedure repeats the process in step (iii) to determine another main body text sample. However, the distances between the text block A and the upper and lower text blocks are stored to avoid any interference to the calculation accuracy of the density when the text block B is used as anchor. For example, the text blocks that located above and below the text block A are B and C respectively. Even when the main body text sample that uses the text block A as an anchor does not pass verification process, the distances between the text block A and the text block B, C still exists. Therefore, the distance between B and C is the sum of the distances between the text blocks A, B and the text blocks A, C. By ignoring the distances between A, B and A, C would result in the distance between the text blocks B and C becomes zero, such an effect will definitely affect the accuracy. The process is continued until the main body text sample passes verifications process, and becomes the main body text. If all of the samples are failed to pass the verification process, then none of the text block can be combined to form a meaningful text. That would mean the target web page has no main body text, or simplicity of the main body text renders it meaningless, and can be considered as having been deleted.

If the title cannot be received, then the step that uses segmented title to verify the main body text is canceled, the main body text sample can be directly seen as the main body text. This will weaken the semantic of the main body text, thus the emphases on the extraction of keywords is the way to detect the existence of web information.

(d) A Step of Extracting the Keywords from the Main Body Text.

Firstly, each section of the main body texts is taken, and all the characters in each section are counted, and then an abstract is extracted in accordance with the character count and the matching degree of the title. This abstract provides no summary of the main body text, rather a portion of the main body text for the purpose of obtaining the keywords. The abstract could be used for other web based product as an information abstract (keywords, key point). The specific process for extracting keywords is as follow.

If there is no title, the extracting process would automatically take the section of the main body text with most word as the abstract.

If there is a title, the equation below is used to calculate the matching degree of the title and the section that contains the most characters, the matching degree is denoted as P''.

$$P''=n'_{w1} \times w_1 + n'_{w2} \times w_2 + \ldots + n'_{wn} \times w_n$$

Wherein, $w_1 \ldots w_n$ represent weights for the title segments respectively, they have same value and representation as with their counter-parts in equation 1. $n'_{w1} \ldots n'_{wn}$ represent the matching numbers of the title segments in the section that has most characters respectively. If the matching degree P''' is greater than 0, then the section is verified and could be used as an abstract. Otherwise, the section with second most characters is verified, and so on.

After extracting the abstract, the extraction process proceeds with segmentation of the abstract, and combines the abstract segments and title segments together for extracting keywords afterward. The process for extracting keywords is as follow.

The title segments are set as the base, then the matching degree P''' between title segments and the abstract segments is calculated by using the equation as listed below.

$$P'''=n''_{w1} \times w_1 + n''_{w2} \times w_2 + \ldots + n''_{wn} \times w_n$$

Wherein, $w_1 \ldots w_n$ represent weights for the title segments $W_1 \ldots W_2$ respectively, they have same value and representation as with their counter-parts in equation 1. $n''_{w1} \ldots n''_{wn}$ represent the matching number of the title segments in the abstract segments respectively. The title segments are extracted based on a descending order of P'''.

The abstract segments are used as bases, the frequency of an abstract segment appears in the abstract is calculated, and the abstract segments are extracted in a descending order in terms of frequency.

The segments that appear in both title and abstract segments are deleted, and then a few segments of the remaining segments are extracted as the keywords. If there is no title, then there would be no combining of title segments. The keywords are taken in a descending order based on the frequency an abstract segment appears in the abstract.

(e) A Step of Storing all the Abstract, Key Works and Other Related URL Information in a Database for Later Use.

The process for extracting the main body text, abstract and keywords from the information of a web page is based on the principle that a specific ratio is directly proportional to the main body text probability. A specific arithmetic is also combined with the process. The technical solution of the present application can obtain the main body text with high probability and the keywords for the detection without any template.

The technical solution of the present application is able to determine the existence of web information by storing the keywords of the web information. Such a method could drastically increase the accuracy of web information detection, effectively maintain a desirable network environment, and provide security. Moreover, with the ability to accurately obtain the main body text, sections, abstract, and keywords from a web page, such method could be used to provide an information base for other network systems or collecting software.

Although the above description makes explanation in detail for the present application in reference to preferred embodiments, the practices of the present application should not be construed to be limited to these descriptions. A person skilled in the art can make various simple deductions or replacements without departing form the spirit and concept

What is claimed is:

1. A computer implemented method for detecting web information comprising:
   pre-extracting keywords from a web page;
   storing a corresponding relationship between the extracted keywords and a URL of the web page in a database;
   obtaining source file information of a web page to be detected;
   searching the database for the keywords that have the same URL as that of the web page to be detected;
   comparing the searched keywords to the obtained source file information of the web page; and
   determining that said web page exists according to a matching degree P;
   wherein the step of pre-extracting comprises:
   (1) obtaining source file information of the web page,
   (2) extracting a main body text from the source file information, and
   (3) extracting the keywords from the main body text; and
   wherein step (1) comprises:
   emulating a HTTP request for returning an information status code, wherein if the code is not 200 or if something unusual occurs, the information of the web page will be deleted, otherwise, step (1) further comprises:
   obtaining a bit array and a coding format of the source file, and utilizing the obtained coding format to convert the obtained bit array of the source file into a character formatted source file.

2. The method according to claim 1, wherein the step (1) further comprises:
   extracting a title from the information of the source file, and
   segmenting the title;
   wherein if there is no title or the title cannot be segmented, then the title will be set as empty.

3. The method according to claim 2, wherein before extracting the main body text from the information of the source file, the method further comprises:
   filtering the source file information to keep a partitionable type tag and the information in the kept tag.

4. The method according to claim 3, wherein the step (2) further comprises:
   (a) dividing the filtered source file information into text blocks based on the partitionable type tags, and storing contents of all the text blocks as well as distance between each block and its next adjacent text block;
   (b) choosing the text block with most characters as a base text block;
   (c) determining a upper limit block and a lower limit block via a relationship between a pre-set threshold and a distance ratio of characters number in the above and below text blocks to the base text block, wherein contents between the upper limit block and the lower limit block are taken as a main body text.

5. The method according to claim 4, wherein the step (a) further comprises:
   storing content of each text block as well as distance between each block and its next adjacent text block via a list;
   wherein the stored data has two attributes, i.e. the character information within the text block and the distance to the next adjacent text block.

6. The method according to claim 4, wherein the step (a) further comprises:
   storing content of each text block as well as distance between each block and the next adjacent text block via a bit array;
   wherein the character information within the text blocks are scattered into the bit array, and the distance between two adjacent text blocks is identified by the number of blanks between the stored locations of the two text blocks in the arrays.

7. The method according to claims 4, wherein the step (a) further comprises a step of calculating the distance between a text block and its adjacent text block, wherein the step of calculating further includes:
   assuming that two adjacent text blocks are $A_1$ and $A_2$, there are partitionable type tags $B_1 \ldots B_n$, the weights of the tags are $W_{B1} \ldots W_{Bn}$, and the number of the partitionable type tags between $A_1$ and $A_2$ are as $n_{B1} \ldots n_{Bn}$, respectively; and
   calculating the distance $d_{A1A2}$ between $A_1$ and $A_2$ as $$d_{A1A2} = n_{B1} \times W_{B1} + n_{B2} \times W_{B2+} \ldots + n_{Bn} \times W_{Bn}.$$

8. The method according to claim 4, wherein the step (C) further includes:
   setting a text block A as the base block, wherein the text block A has a characters,
   setting an adjacent text block above the base block as text block $A_1$, wherein the text block $A_1$ has $a_1$ characters,
   setting an adjacent text block below the base block as text block $A_2$, wherein the text block $A_2$ has $a_2$ characters,
   setting a distance $d_1$ between the text block $A_1$ and the text block A, setting a distance $d_2$ between the text block A and the text block $A_2$, and setting a threshold of M;
   if $a_1/d_1 = M_1 \geq M$ and $a_2/d_2 = M_2 \geq M$, taking a average $M_{avg}$ of $M_1$ and $M_2$ as a measured scale for calculating the upper and lower limit;
   if only one of $M_1$ and $M_2$ is larger or equal to the threshold M, taking an average of said one and M to obtain a new $M_{avg}$ as the measured scale for calculating the upper and lower limit,
   else, taking the text block as the main body text sample;
   after the $M_{avg}$ is calculated, the step (C) further includes reorganizing the text block A, and the step of reorganizing further includes:
   if $a_1/d_1 = M_1 \geq M$, and $a_2/d_2 = M_2 \geq M$, then taking $A' = A_1 + A + A_2$;
   taking the text block $A_1$ as a new base block, and searching from $A_1$ in an upward direction;
   comparing the $M_{avg}$ to a ratio of the number of characters in a upper adjacent text block $A_{s1}$ to the distance $d_{s1}$ between $A_1$ and $A_{s1}$,
   if the ratio is greater then $M_{avg}$, then incorporating the content of the text block $A_{s1}$ into the text block A, and then searching in an upward direction with $A_{s1}$ as the new base block until one of the text blocks does not satisfy the requirement, similarly, repeating the search in a down direction with $A_2$ as the base block until one of the text blocks does not satisfy the requirement, and taking the last text block A as the main body text sample; and
   if one of $M_1$ and $M_2$ is larger or equal to the threshold M, assuming $M_1 \geq M$, then taking $A' = A + A_1$, searching in the upward direction with text block $A_1$ as the base block until one of the text blocks does not satisfy the requirement, and taking the last text block A' as the main body text sample.

9. The method according to claim 4, further comprising:
if the title is empty, taking the main body text sample in step (b) as the main body text;
otherwise,
- (i) verifying the main body text sample in accordance with the title segments;
- (ii) if the verification fails, setting the text block with most characters as the base text block, repeating the step(c) and proceeding with verification of step (i);
if the verification is success, taking the main body text sample as the main body text.

10. The method according to claim 9, wherein the step (i) for verifying the main body text sample further includes:
comparing the title segments to the main body text sample to obtain a matching degree P';
determining whether the main body text sample is the main body text in accordance with the matching degree P', if the matching degree P' is larger or equal to a preset threshold M', the sample is verified; otherwise, the verification fails.

11. The method according to claim 10, wherein the matching degree P' is calculated by rule of:

$$P' = n_{w1} \times w_1 + n_{w2} \times w_2 + \ldots + n_{wn} \times w_n;$$

wherein $W_1 \ldots W_n$ are the title segments, and $w_1 \ldots w_n$ are weights of the title segments, $n_{w1} \ldots n_{wn}$ are matching numbers of the title segments in the main body text.

12. The method according claim 2, wherein the step (3) of extracting the keywords from the main body text further includes:
(1) extracting all sections of the main body text, and counting the characters number in each of the sections; and
(2) extracting an abstract from the main body text,
if there is no title, automatically taking the section with most characters in the main body text as the abstract,
if there is a title, segmenting the title, and calculating a matching degree P" of the title and the section with most characters in the main body text by rule of $$P'' = n'_{w1} \times w_1 + n'_{w2} \times w_2 + \ldots + n'_{wn} \times w_n$$

where,
$w_1 \ldots w_n$ represent as weights for the title segments respectively, they have same value and representation as their counter-parts in equation 1, $n'_{w1} \ldots n'_{wn}$ represent the matching numbers of the title segments in the section that has most characters respectively,
if the matching degree P" is greater then 0, then the section is used as an abstract, otherwise, verifying the section with second most characters, and so on; and
(3) segmenting the abstract, and extracting the keywords from the abstract,
if the title is empty, calculating the frequency of an abstract segment appears in the abstract, and extracting the keywords from the abstract in a descending order of appearance frequency,
if there is a title, calculating a matching degree P''' between the title segments and the abstract segments by rule of $$P''' = n''_{w1} \times w_1 + n''_{w2} \times w_2 + \ldots + n''_{wn} \times w_n$$

wherein, $w_1 \ldots w_n$ represent weights for the title segments $W_1 \ldots W_2$ respectively, $n''_{w1} \ldots n''_{wn}$ represent the matching number of the title segments in the abstract segments respectively, the title segments is extracted based on a descending order of P''',
calculating the appearance frequency of an abstract segment appears in the abstract, and extracting the keywords from the abstract in a descending order in terms of the appearance frequency,
deleting the segments that appears in both title and abstract segments, then extracting a few segments from the remaining segments as keywords.

13. The method according to claim 1, wherein before comparing the keywords to the source file information of the web page to be detected, the method further includes filtering the source file information of the web page to be detected to remove useless information, the useless information includes a title.

14. A system for detecting information on a web page, including:
a extracting device (11) configured to extract keywords from a web page;
a storing device (12) configured to store a corresponding relationship between the extracted keywords and a URL of the web page in a database;
an obtaining device (13) configured to obtain a source file of the web page; and
a comparing device (14) configured to search the database for the keywords that have the same URL as that of the web page, to compare the searched keywords to the source file information of the web page and to determine that the web page exists according to a matching degree P;
wherein the extracting device (11) is further configured to perform the steps of:
(1) obtaining source file information of the web page,
(2) extracting a main body text from the source file information, and
(3) extracting the keywords from the main body text; and
wherein step (1) comprises:
emulating a HTTP request for returning an information status code, wherein if the code is not 200 or if something unusual occurs, the information of the web page will be deleted, otherwise, step (1) further comprises:
obtaining a bit array and a coding format of the source file, and utilizing the obtained coding format to convert the obtained bit array of the source file into a character formatted source file.

15. The system according to claim 14, further including a filtering device (15) configured to filter out useless information of the source file of the web page.

* * * * *